(12) United States Patent
Martin et al.

(10) Patent No.: US 12,708,071 B2
(45) Date of Patent: Aug. 18, 2026

(54) SYSTEM AND METHOD FOR CONTROLLING THE OPERATION OF A HARVESTING IMPLEMENT

(71) Applicant: CNH Industrial America LLC, New Holland, PA (US)

(72) Inventors: Jethro Martin, Ephrata, PA (US); Jeffrey C. Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 347 days.

(21) Appl. No.: 18/394,779

(22) Filed: Dec. 22, 2023

(65) Prior Publication Data

US 2025/0204314 A1 Jun. 26, 2025

(51) Int. Cl.
*A01D 41/14* (2006.01)
*A01D 41/127* (2006.01)

(52) U.S. Cl.
CPC ....... *A01D 41/141* (2013.01); *A01D 41/1274* (2013.01)

(58) Field of Classification Search
CPC .............. A01D 41/141; A01D 41/1274; A01D 41/127; A01D 57/04; A01D 41/1278
See application file for complete search history.

(56) References Cited

U.S. PATENT DOCUMENTS 5,535,577 A 7/1996 Chmielewski et al.
6,216,456 B1 * 4/2001 Mitchell ................. F15B 21/08 417/213
8,973,342 B2 3/2015 Ritter et al.
9,545,062 B2 1/2017 Raszga et al.
10,959,374 B2 3/2021 Duerksen et al.
2003/0110749 A1 * 6/2003 Frego ..................... A01D 69/03 56/11.9
2020/0015417 A1 * 1/2020 Linde .................... A01F 12/444
2023/0128642 A1 * 4/2023 Pintore ................. E02F 9/2228 60/422
2024/0334867 A1 * 10/2024 Honey ................. A01D 34/246

FOREIGN PATENT DOCUMENTS

EP 2520152 A1 11/2012
WO WO2021222592 A1 11/2021

OTHER PUBLICATIONS

Extended European Search Report for Application No. EP 24220819.7, mailed May 13, 2025, 11 pages.

* cited by examiner

*Primary Examiner* — Michael C Zarroli
(74) *Attorney, Agent, or Firm* — Dority & Manning, P.A.

(57) ABSTRACT

A system for controlling the operation of a harvesting implement includes hydraulically driven implement components positioned on the implement and configured to receive a flow of pressurized hydraulic fluid from a harvester base vehicle. Furthermore, the system includes an implement-based pressure sensor positioned on the implement and configured to generate data indicative of the maximum pressure value of the hydraulically driven components. Moreover, the system includes an implement-based computing system positioned on the implement and communicatively coupled to the implement-based pressure sensor and a vehicle-based computing system positioned on the vehicle. The implement-based computing system is configured to determine the maximum pressure value based on the data generated by the pressure sensor and transmit the maximum pressure value to the vehicle-based computing system.

18 Claims, 4 Drawing Sheets

SYSTEM AND METHOD FOR CONTROLLING THE OPERATION OF A HARVESTING IMPLEMENT

FIELD OF THE INVENTION

The present disclosure generally relates to harvesting implements, and, more particularly, to systems and methods for controlling the operation of a harvesting implement.

BACKGROUND OF THE INVENTION

An agricultural harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects crop materials from the field and feeds it to the base harvester for further processing.

In general, the harvesting implement includes one or more hydraulically driven components positioned thereon to facilitate harvesting. As such, it is necessary to convey hydraulic fluid between a fluid reservoir positioned on the base harvester and the hydraulically driven component(s) positioned on the harvesting implement through, for example, one or more fluid lines. In this respect, a fluid coupler is typically positioned between the base harvester and the harvesting implement allows the hydraulic fluid to be conveyed between fluid lines positioned on the base harvester and fluid lines positioned on the harvesting implement.

To control the operation of the hydraulically driven component(s), it is necessary to determine the maximum pressure of the hydraulic fluid being supplied to such components. As such, conventional harvesters include a pressure sensing loop extending between the hydraulically driven component(s) on the harvesting implement and one or more components (e.g., an actuator associated with a swash plate of a pump) on the base harvester. Specifically, the pressure sensing loop conveys a small amount of hydraulic fluid from the hydraulically driven component(s) on the harvesting implement operating at the highest pressure, through the fluid coupler, and to the component(s) on the base harvester. However, the fluid coupler is prone to introducing contaminants into the fluid lines. Since the pressure sensing loop is typically smaller than other fluid lines, the introduction of contaminants into the pressure sensing loop may lead to inaccurate pressure readings within the pressure sensing loop and, thus, control of the hydraulically driven component(s) of the harvesting implement. In this respect, various systems for controlling the operation of the harvesting implement have been developed. While such systems work well, further improvements are needed.

Accordingly, an improved system and method for controlling the operation of a harvesting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a harvesting implement. The harvesting implement includes a header frame configured to be pivotably coupled to a harvester base vehicle. Moreover, the harvesting implement includes a reel pivotably coupled to the header frame and configured to direct crop material toward a cutting bar configured to sever the crop material from a field surface. Furthermore, the harvesting implement includes a plurality of implement actuators configured to pivotably adjust the header frame and the reel. The plurality of implement actuators are configured to receive a flow of pressurized hydraulic fluid from the harvester base vehicle. Additionally, the harvesting implement includes an implement-based pressure sensor configured to generate data indicative of an implement maximum pressure value. The implement maximum pressure value is a maximum pressure value of the plurality of implement actuators. Furthermore, the harvesting implement includes an implement-based computing system communicatively coupled to the implement-based pressure sensor and a vehicle-based computing system positioned on the harvester base vehicle. The implement-based computing system is configured to determine the implement maximum pressure value based on the data generated by the implement-based pressure sensor. Additionally, the implement-based computing system is configured to transmit the determined implement maximum pressure value to the vehicle-based computing system.

In another aspect, the present subject matter is directed to a system for controlling the operation of a harvesting implement. The system includes a plurality of hydraulically driven implement components positioned on a harvesting implement. The plurality of hydraulically driven implement components are configured to receive a flow of pressurized hydraulic fluid from a harvester base vehicle configured to tow the harvesting implement. Furthermore, the system includes an implement-based pressure sensor positioned on the harvesting implement and configured to generate data indicative of an implement maximum pressure value. The implement maximum pressure value is a maximum pressure value of the plurality of hydraulically driven implement components. Moreover, the system includes an implement-based computing system positioned on the harvesting implement and communicatively coupled to the implement-based pressure sensor and a vehicle-based computing system positioned on the harvester base vehicle. The implement-based computing system is configured to determine the implement maximum pressure value based on the data generated by the implement-based pressure sensor. Additionally, the implement-based computing system is configured to transmit the determined implement maximum pressure value to the vehicle-based computing system.

In another aspect, the present subject matter is directed to a method for controlling the operation of a harvesting implement. The harvesting implement includes a plurality of hydraulically driven implement components configured to receive a flow of pressurized hydraulic fluid from a harvester base vehicle. Additionally, the harvesting implement includes a fluid reservoir and a pump configured to pump hydraulic fluid between the fluid reservoir and the plurality of hydraulically driven implement components. The method includes receiving, with an implement-based computing system, implement-based pressure sensor data indicative of an implement maximum pressure value. The implement maximum pressure value is a maximum pressure value of the plurality of hydraulically driven implement components. Furthermore, the method includes determining, with the implement-based computing system, the implement maximum pressure value based on the received implement-based pressure sensor data. Moreover, the method includes transmitting, with the implement-based computing system, the determined implement maximum pressure value to a vehicle-based computing system.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
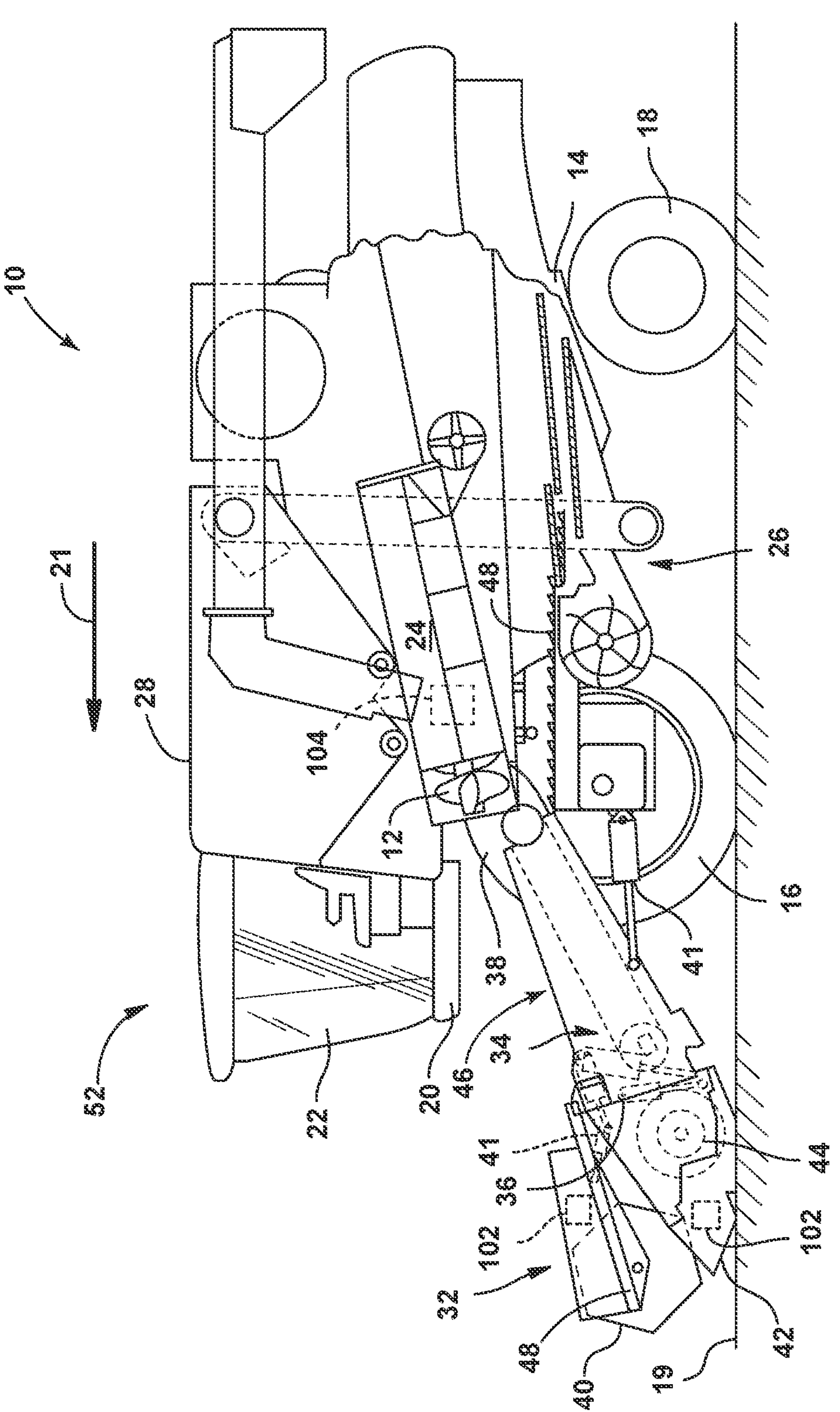
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for controlling the operation of a harvesting implement. As will be described below, the harvesting implement includes a header frame configured to be coupled to a harvester base vehicle. The harvesting implement may also include a reel pivotably coupled to the header frame and configured to direct crop material toward a cutting bar configured to sever the crop material from the field surface. Additionally, the harvesting implement includes a plurality of hydraulically driven implement components, such as implement actuators configured to adjust the header frame and/or the reel, positioned on the harvesting implement. The plurality of hydraulically driven implement components are configured to receive a flow of pressurized hydraulic fluid from a reservoir positioned on the harvester base vehicle.

Furthermore, an implement-based computing system of the disclosed system is positioned on the harvesting implement and configured to receive and transmit maximum pressure values to and from a vehicle-based computing system positioned on the harvester base vehicle. More specifically, the implement-based computing system is configured to receive data from one or more implement-based pressure sensors positioned on the harvesting implement. Such data, in turn, is indicative of the implement maximum pressure value, which is the maximum pressure value of the plurality of hydraulically driven implement components. Then, the implement-based computing system is configured to determine the implement maximum pressure value based on the received data from the implement-based pressure sensor(s). Thereafter, the implement-based computing system is configured to transmit the implement maximum pressure value the vehicle-based computing system (e.g., via ISOBUS Class 3 communications protocols (ISO 11783-9), CANbus, etc.). In several embodiments, the implement-based computing system may be configured to receive a determined vehicle maximum pressure value, which may be the maximum pressure value of a plurality of hydraulically driven vehicle components positioned on the harvester base vehicle, from the vehicle-based computing system. Thereafter, the vehicle-based computing system may be configured to determine an overall maximum pressure value that is equal to the greater of the two pressure values. In this respect, the vehicle-based computing system may be configured to control the operation of a pump configured to pump hydraulic fluid between a fluid reservoir and the plurality of hydraulically driven implement components based on the determined overall maximum pressure value.

Controlling the operation of the harvesting implement using maximum pressure values transmitted between an implement-based computing system positioned on the harvesting implement and a vehicle-based computing system positioned on the harvester base vehicle improves the operation of the harvesting implement. More specifically, the pressure sensing loop conveys a small amount of hydraulic fluid from the hydraulically driven component(s) on the harvesting implement operating at the highest pressure, through a fluid coupler, and to the component(s) on the harvester base vehicle. However, the fluid coupler is prone to introducing contaminants into the fluid lines. Since the pressure sensing loop is typically smaller than other fluid lines, the introduction of contaminants into the pressure sensing loop may lead to inaccurate pressure readings within the pressure sensing loop and, thus, control of the hydraulically driven component(s) of the harvesting implement. However, the disclosed system utilizes an implement-based computing system positioned on the harvesting implement to electronically transmit and receive determined maximum pressure values to and from a vehicle-based computing system positioned on the harvester base vehicle. As such, there is no need for the pressure sensing loop or the fluid coupler, which are coupled across/between the harvester base vehicle and the harvesting implement, as the pressure data can be transmitted between the two computing systems. In this respect, the pressure readings are more accurate, thereby improving the control of the harvesting implement.

Referring now to the drawings, FIG. 1 illustrates a simplified, partial sectional side view of one embodiment of an agricultural vehicle, such as an agricultural harvester 10. The harvester 10 may be configured as an axial-flow type combine, wherein crop material is threshed and separated while it is advanced by and along a longitudinally arranged rotor 12. The harvester 10 includes a harvester base vehicle 52 configured to support a harvesting implement 32, such as a header, configured to engage the crop material within the field. The harvester base vehicle 52 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement (indicated by arrow 21 in FIG. 1) relative to the ground surface 19. Additionally, an operator's platform 20 with an operator's cab 22, a threshing and separating assembly 24, a grain cleaning assembly 26 and a holding tank 28 may be supported by the frame 14. Additionally, the harvester base vehicle 52 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, the harvesting implement 32 may extend forward of the main frame 14 of the harvester base vehicle 52. The harvesting implement 32 includes a header frame 46 pivotably coupled to the main frame 14 for generally vertical movement. In general, the header frame 46 may be configured to serve as a support structure for the harvesting implement 32. As shown in FIG. 1, the header frame 46 may extend between a front end 36 and a rear end 38 pivotably coupled to the harvester base vehicle 52. The rear end 38 of the header frame 46 may be pivotably coupled to a portion of the harvester base vehicle 52 to allow the front end 36 of the header frame 46 and, thus, the harvesting implement 32 to be moved upwardly and downwardly relative to the ground surface 19 to set the desired harvesting or cutting height for the harvesting implement 32.

Moreover, in several embodiments, a plurality of implement actuators 41 may be positioned on the harvesting implement 32. One or more implement actuators of the plurality of implement actuators 41 may be configured to pivotably adjust the header frame 46, for example, the height or vertical positioning of the harvesting implement 32 relative to the ground. In some embodiments, the one or more implement actuators of the plurality of implement actuators 41 may be coupled between the header frame 46 of the harvesting implement 32 and the frame 14 of the harvester 10 to pivot the header frame 46 such that the harvesting implement 32 is raised or lowered relative to the ground surface 19. The plurality of implement actuators 41 may be configured as hydraulically driven actuators (e.g., cylinders, motors, etc.) configured to receive a flow of pressurized hydraulic fluid from one or more hydraulic circuits.

In some embodiments, the harvesting implement 32 includes a reel 40 rotatably coupled to a reel frame 48 which is, in turn, rotatably coupled to a header frame 46 of the harvesting implement 32. The reel 40 is generally configured to contact crop material before a cutting bar 42 of the harvesting implement 32. For instance, the reel 40 may include tines and/or the like such that, when crop materials contact the reel 40, the crop materials may be oriented into a substantially uniform direction and guided toward the cutting bar 42. The vertical positioning of the reel 40 (e.g., relative to the ground and/or chassis 22) may be adjusted by one or more implement actuators of the plurality of implement actuators 41, some of which may be coupled between the reel frame 48 and the header frame 46. For instance, one or more of the implement actuators of the plurality of implement actuators 41 may be a cylinder(s) which is extendable and retractable to adjust a vertical position of the reel 40.

As the harvester 10 is propelled forwardly over a field with standing crop, the crop material is directed towards the cutting bar 42 by the reel 40. The crop material is severed from the stubble by the cutting bar 42, which is located at the front of the harvesting implement 32. Then, the crop material is delivered by a header auger 44 to the front end 36 of a feeder 34, which supplies the cut crop to the threshing and separating assembly 24 to be further processed.

It should be appreciated that the configuration of the harvester 10 described above and shown in FIG. 1 is provided only to place the present subject matter in an exemplary field of use. Thus, it should be appreciated that the present subject matter may be readily adaptable to any manner of agricultural harvester configuration.

Furthermore, the harvesting implement 32 may include one or more implement-based pressure sensors 102 positioned thereon. The implement-based pressure sensor(s) 102 is configured to generate data indicative of an implement maximum pressure value, which is the maximum pressure value of the plurality of implement actuators 41. Such data may subsequently be used to determine the implement maximum pressure value, which may be transmitted between computing systems and used to control the flow of pressurized hydraulic fluid to and from the plurality of implement actuators 41.

In general, the implement-based pressure sensor(s) 102 may correspond to any suitable pressure sensor(s) configured to generate data indicative the implement maximum pressure value. In several embodiments, the implement-based pressure sensor(s) 102 may be configured as an electromagnetic pressure sensor. However, in alternative embodiments, the implement-based pressure sensor(s) 102 may be configured as any other suitable pressure sensor(s) for generating data indicative of the implement maximum pressure value. For example, the implement-based pressure sensor(s) 102 may be configured as a diaphragm pressure sensor, piston pressure sensor, strain-gauge pressure sensor, and/or the like.

Furthermore, the harvesting implement 12 may include any number of implement-based pressure sensors 102 provided at any suitable location that allows data indicative of the maximum pressure value of the plurality of implement actuators 41 to be generated.

Figure 3:
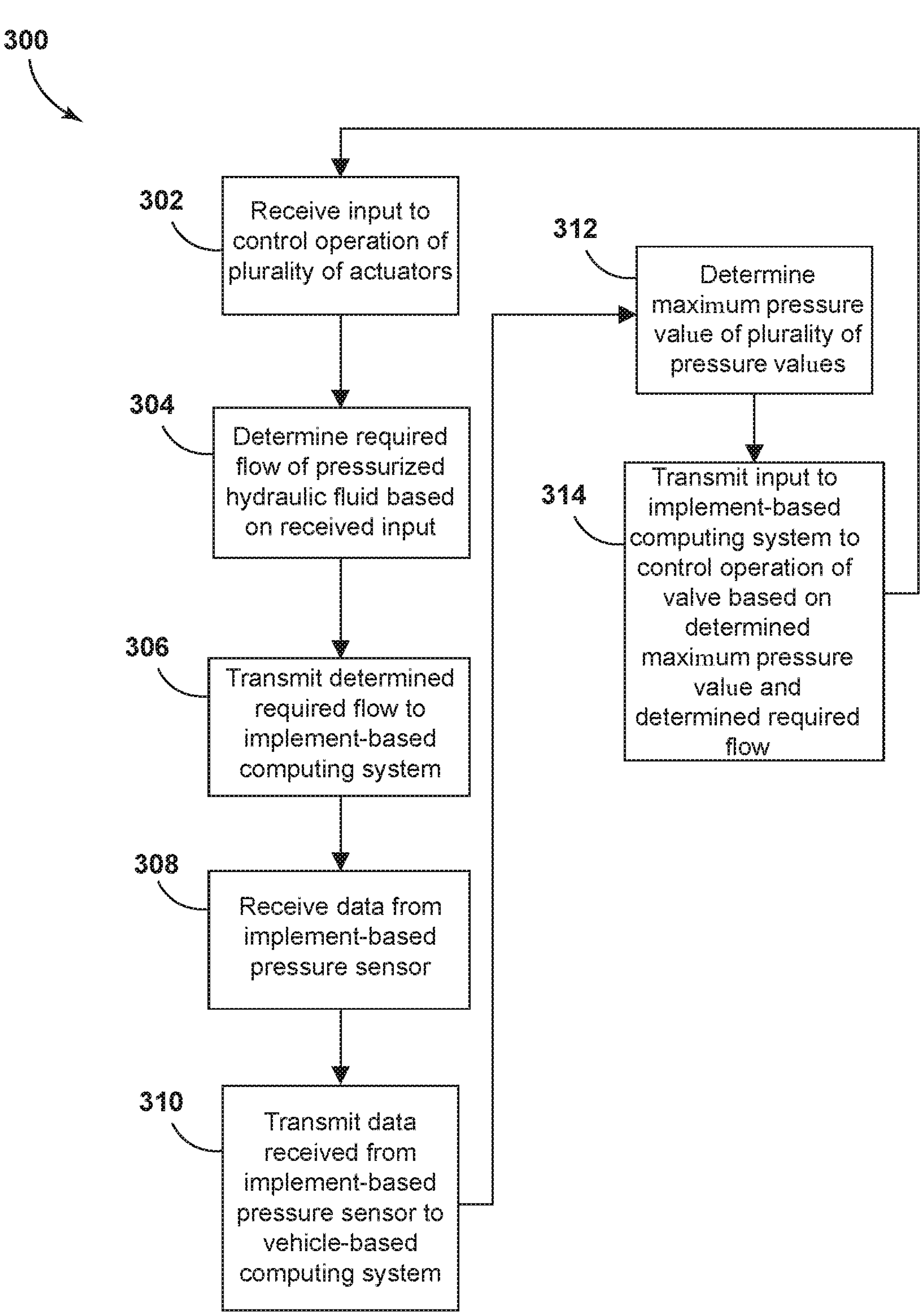
FIG. 3 illustrates a flow diagram of one embodiment of control logic for controlling the operation of a harvesting implement in accordance with aspects of the present subject matter.

Moreover, the harvester base vehicle 52 may include one or more vehicle-based pressure sensors 104 positioned thereon. The vehicle-based pressure sensor(s) 104 is configured to generate data indicative of a vehicle maximum pressure value, which is a maximum pressure value of one or more pumps 216 (FIG. 3). Such data may subsequently be used to determine the vehicle maximum pressure value, which may be transmitted between computing systems and used to control the flow of pressurized hydraulic fluid to and from the plurality of implement actuators 41.

In general, the vehicle-based pressure sensor(s) 104 may correspond to any suitable pressure sensor(s) configured to generate data indicative the vehicle maximum pressure value. In several embodiments, the vehicle-based pressure sensor(s) 104 may be configured as an electromagnetic pressure sensor. However, in alternative embodiments, the vehicle-based pressure sensor(s) 104 may be configured as any other suitable pressure sensor(s) for generating data indicative of the vehicle maximum pressure value. For example, the vehicle-based pressure sensor(s) 104 may be configured as a diaphragm pressure sensor, piston pressure sensor, strain-gauge pressure sensor, and/or the like.

Furthermore, the harvester base vehicle 52 may include any number of vehicle-based pressure sensors 104 provided at any suitable location that allows data indicative of the maximum pressure value of the pump(s) 216 (FIG. 3) to be generated.

Figure 2:
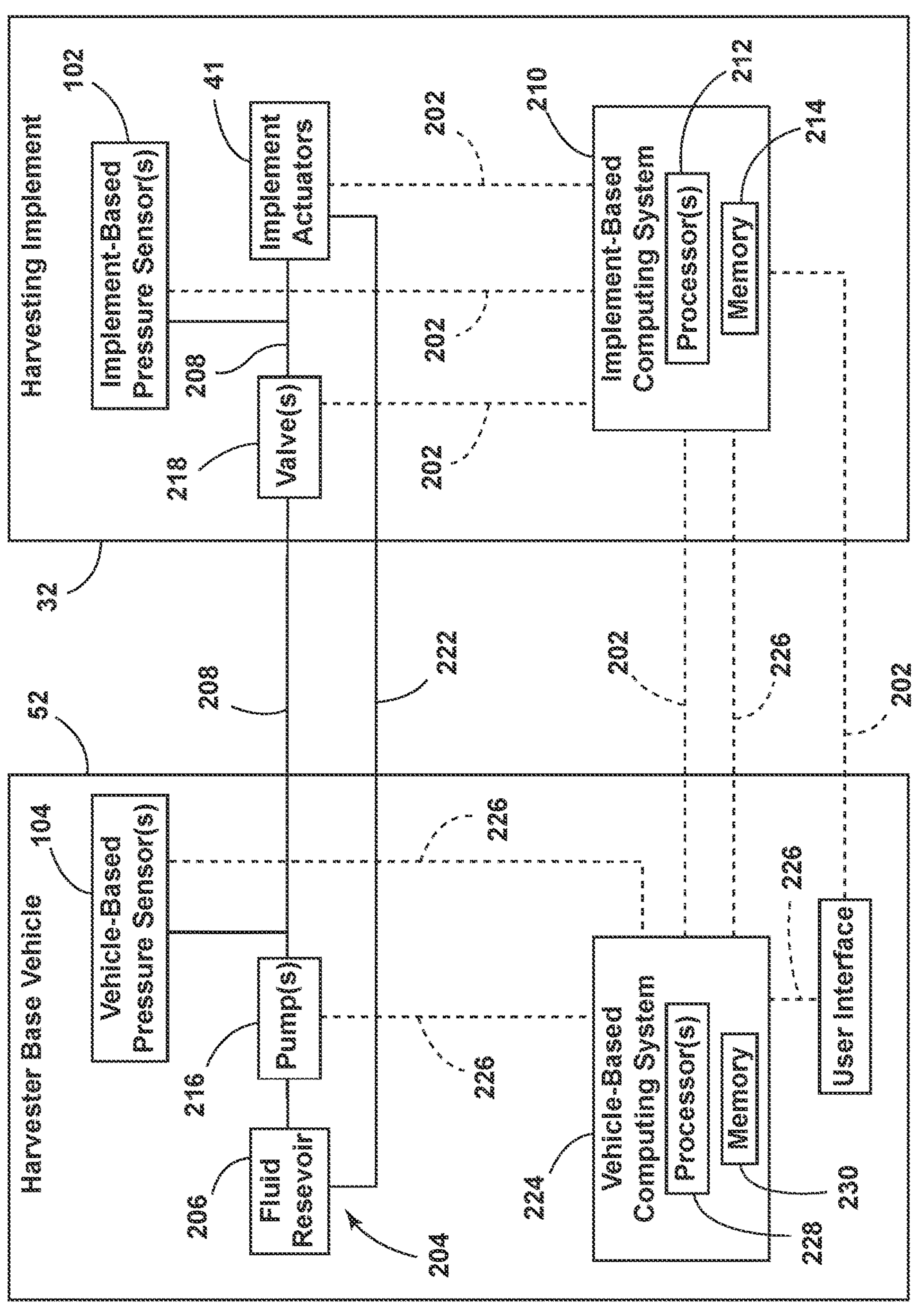
FIG. 2 illustrates a schematic view of one embodiment of a system for controlling the operation of a harvesting implement in accordance with aspects of the present subject matter.

Referring now to FIG. 2, a schematic view of one embodiment of a system 200 for controlling the operation of a harvesting implement is illustrated in accordance with aspects of the present subject matter. In general, the system 200 will be described herein with reference to the agricultural harvester 10 described above with reference to FIG. 1. However, it should be appreciated by those of ordinary skill in the art that the disclosed system 200 may generally be utilized with agricultural harvesters having any other suitable harvester configuration. Additionally, for purposes of illustration, communicative links of the system 200 shown in FIG. 2 are indicated by dashed lines. Conversely, the fluid conduits of the system 200 shown in FIG. 2 are indicated by solid lines. Furthermore, the one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communicate mechanisms are utilized). For example, wireless communications networks may include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

As shown in FIG. 2, the system 200 may include a hydraulic circuit 204 configured to provide a flow of pressurized hydraulic fluid from a fluid reservoir 206 positioned on the harvester base vehicle 52 to the plurality of implement actuators 41 positioned on the harvesting implement 32. Specifically, in several embodiments, the plurality of implement actuators 41 may be driven or otherwise powered by the flow of hydraulic fluid from the harvester base vehicle 52. In this regard, a first fluid conduit 208 may be configured to convey the flow of hydraulic fluid from the fluid reservoir 206 to the plurality of implement actuators 41 in a manner that drives the plurality of implement actuators 41, thereby resulting in pivotable adjustment of the reel 40 and/or the header frame 46 of the harvesting implement 32. A return fluid conduit 222 may be configured to return the fluid delivered to the plurality of implement actuators 41 to the fluid reservoir 206. It should be appreciated that, in alternative embodiments, the system 200 may include additional fluid conduits configured to convey the flow of hydraulic fluid from the fluid reservoir 206 to any other suitable fluid-driven or fluid-actuated device(s) or component(s) of the harvesting implement 32.

Furthermore, the system 200 may include any suitable fluid-related components for controlling the flow of hydraulic fluid between the fluid reservoir 206 and the plurality of implement actuators 41. For example, as shown in FIG. 2, the system 200 may include the pump(s) 216 positioned on the harvester base vehicle 52 between the fluid reservoir 206 and the plurality of implement actuators 41 of the harvesting implement 32, with the pump(s) 216 configured to pump hydraulic fluid through the first fluid conduit 208 between the fluid reservoir 206 and the plurality of implement actuators 41. Additionally, the pump(s) 216 may be configured to control the flow of pressurized hydraulic fluid between the plurality of implement actuators 41 and the fluid reservoir 206 by increasing or decreasing the flow of pressurized hydraulic fluid. Furthermore, the system 200 may include one or more valves 218 positioned on the harvesting implement 32 between the pump(s) 216 of the harvester 10 and the plurality of implement actuators 41, with the valve(s) 218 configured to control the flow of pressurized hydraulic fluid to the plurality of implement actuators 41, for example, by selectively occluding the flow of fluid through the first fluid conduit 208. It should be appreciated that the valve(s) 218 may be configured as any suitable valve(s) positioned on the harvesting implement 32. Moreover, it should be appreciated that the valve(s) 218 may be configured to control the flow of pressurized hydraulic fluid to any other suitable components of the harvesting implement 32.

Additionally, as shown in FIG. 2, the system 200 includes an implement-based computing system 210 positioned on the harvesting implement 32 and communicatively coupled to one or more components of the harvesting implement 32, the harvester base vehicle 52, and/or the system 200 to allow the operation of such components to be electronically or automatically controlled by the implement-based computing system 210. For example, the implement-based computing system 210 may be communicatively coupled to the implement-based pressure sensor(s) 102 via the communicative link 202. As such, the implement-based computing system 210 may be configured to receive data from the implement-based pressure sensor(s) 102 indicative of the implement maximum pressure value, which is the maximum pressure value of the plurality of implement actuators 41. Moreover, the implement-based computing system 210 may be communicatively coupled to the plurality of implement actuators 41 via the communicative link 202. As such, the implement-based computing system 210 may be configured to control the operation of the plurality of implement actuators 41 to pivotably adjust the header frame 46 and/or the reel 40. Additionally, the implement-based computing system 210 may be communicatively coupled to the valve(s) 218 via the communicative link 202. As such, the implement-based computing system 210 may be configured to control an operation of the valve(s) 218 to control the flow of pressurized hydraulic fluid within the hydraulic circuit 204, for example, by selectively occluding the flow of hydraulic fluid through the first fluid conduit 208.

In general, the implement-based computing system 210 may comprise any suitable processor-based devices known in the art, such as given controllers or computing devices or any suitable combination of controllers or computing devices. Thus, in several embodiments, the implement-based computing system 210 may include one or more processor(s) 212 and associated memory device(s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the implement-based computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s)

214 may generally be configured to store suitable computer-readable instructions that, when implemented by the processor(s) 212, configure the implement-based computing system 210 to perform various computer-implemented functions, such as one or more aspects of the methods and algorithms that will be described herein. In addition, the implement-based computing system 210 may also include various other suitable components, such as a communications circuit or module, one or more input/output channels, a data/control bus and/or the like.

Furthermore, it should also be appreciated that the functions of the implement-based computing system 210 may be performed by a single processor-based device or may be distributed across any number of processor-based devices, in which instance such devices may be considered to form part of the implement-based computing system 210. For instance, the functions of the implement-based computing system 210 may be distributed across multiple application-specific controllers or computing devices, such as an implement controller and/or the like.

Furthermore, as shown in FIG. 2, the system 200 includes a vehicle-based computing system 224 positioned on the harvester base vehicle 52 and communicatively coupled to one or more components of the harvester base vehicle 52, the harvesting implement 32, and/or the system 200 to allow the operation of such components to be electronically or automatically controlled by the vehicle-based computing system 224. For example, the vehicle-based computing system 224 may be communicatively coupled to the vehicle-based pressure sensor(s) 104 via the communicative link 226. As such, the vehicle-based computing system 224 may be configured to receive data from the vehicle-based pressure sensor(s) 104 indicative of the vehicle maximum pressure value, which is the maximum pressure value of the pump(s) 216. Moreover, the vehicle-based computing system 224 may be communicatively coupled to the pump(s) 216 via the communicative link 226. As such, the vehicle-based computing system 224 may be configured to control the operation of pump(s) 216 to control the flow of pressurized hydraulic fluid between the plurality of implement actuators 41 and the fluid reservoir 206. Additionally, the vehicle-based computing system 224 and the implement-based computing system 210 may be communicatively coupled to each other via the communicative links 202, 226. In this respect, the vehicle-based computing system 224 and the implement-based computing system 210 may be configured to receive and transmit information (e.g., determined maximum pressure values) or instructions from/to each other. In addition, the vehicle-based computing system 224 and the implement-based computing system 210 may be communicatively coupled to any other suitable components of the harvesting implement 32, the harvester base vehicle 52, and/or the system 200.

In general, the vehicle-based computing system 224 may comprise any suitable processor-based devices known in the art, such as given controllers or computing devices or any suitable combination of controllers or computing devices. Thus, in several embodiments, the vehicle-based computing system 224 may include one or more processor(s) 228 and associated memory device(s) 230 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 230 of the vehicle-based computing system 224 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 230 may generally be configured to store suitable computer-readable instructions that, when implemented by the processor(s) 228, configure the vehicle-based computing system 224 to perform various computer-implemented functions, such as one or more aspects of the methods and algorithms that will be described herein. In addition, the vehicle-based computing system 224 may also include various other suitable components, such as a communications circuit or module, one or more input/output channels, a data/control bus and/or the like.

Furthermore, it should also be appreciated that the functions of the vehicle-based computing system 224 may be performed by a single processor-based device or may be distributed across any number of processor-based devices, in which instance such devices may be considered to form part of the vehicle-based computing system 224. For instance, the functions of the vehicle-based computing system 224 may be distributed across multiple application-specific controllers or computing devices, such as a navigation controller, an engine computing controller, a transmission controller and/or the like.

In addition, the system 200 may also include a user interface 220. More specifically, the user interface 220 may be configured to provide feedback, such as feedback associated with the maximum pressure values, to the operator. As such, the user interface 220 may include one or more feedback devices (not shown), such as display screens, speakers, warning lights, and/or the like, which are configured to provide feedback from the implement-based computing system 210 and/or the vehicle-based computing system 224 to the operator. As such, the user interface 220 may, in turn, be communicatively coupled to the implement-based computing system 210 via the communicative link 202 to permit the feedback to be transmitted from the implement-based computing system 210 to the user interface 220. Additionally, or alternatively, the user interface 220 may be communicatively coupled to the vehicle-based computing system 224 via the communicative link 226 to permit the feedback to be transmitted from the vehicle-based computing system 224 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. Furthermore, in one embodiment, the user interface 220 may be mounted or otherwise positioned within the operator's cab 30 of the harvester base vehicle 52. However, in alternative embodiments, the user interface 220 may mounted at any other suitable location.

Referring now to FIG. 3, a flow diagram of one embodiment of control logic 300 that may be executed by the implement-based computing system 210 and/or the vehicle-based computing system 224 (or any other suitable computing system) for controlling the operation of a harvesting implement is illustrated in accordance with aspects of the present subject matter. Specifically, the control logic 300 shown in FIG. 3 is representative of steps of one embodiment of an algorithm that can be executed to control the operation of the harvesting implement 32 using maximum pressure values transmitted between the harvesting implement 32 and the harvester base vehicle 52 and without the use of a hydraulic pressure sensing loop. However, in other embodiments, the control logic 300 may be used in association with any other suitable system, application, and/or the like for controlling the operation of the harvesting implement 32.

As shown in FIG. 3, at (302), the control logic 300 includes receiving implement-based pressure sensor data indicative of the implement maximum pressure value, which is the maximum pressure value of the plurality of implement actuators. Specifically, as mentioned above, in several embodiments, the implement-based computing system 210 may be communicatively coupled to the implement-based pressure sensor(s) 102 via the communicative link 202. In this respect, during operation of the harvesting implement 32, the implement-based computing system 210 may receive the data from the implement-based pressure sensor(s) 102 via the communicative link 202. Such data, in turn, is indicative of the implement maximum pressure value, which is the maximum pressure value of the plurality of implement actuators 41.

Additionally, at (304), the control logic 300 includes determining the implement maximum pressure value based on the received implement-based pressure sensor data. Specifically, in several embodiments, the implement-based computing system 210 may be configured to determine the implement maximum pressure value based on the implement-based pressure sensor data received at (302). For example, the implement-based computing system 210 may access a look-up table(s) stored within its memory device(s) 214 that correlates the implement-based pressure sensor data received at (302) to the implement maximum pressure value.

Furthermore, as shown in FIG. 3, at (306), the control logic 300 includes receiving vehicle-based pressure sensor data indicative of the vehicle maximum pressure value, which is the maximum pressure value of the pump. Specifically, as mentioned above, in several embodiments, the vehicle-based computing system 224 may be communicatively coupled to the vehicle-based pressure sensor(s) 104 via the communicative link 226. In this respect, during operation of the harvesting implement 32, the vehicle-based computing system 224 may receive the data from the vehicle-based pressure sensor(s) 104 via the communicative link 226. Such data, in turn, is indicative of the vehicle maximum pressure value, which is the maximum pressure value of the pump(s) 216.

Moreover, at (308), the control logic 300 includes determining the vehicle maximum pressure value based on the received vehicle-based sensor pressure data. Specifically, in several embodiments, the vehicle-based computing system 224 may be configured to determine the vehicle maximum pressure value based on the vehicle-based pressure sensor data received at (306). For example, the vehicle-based computing system 224 may access a look-up table(s) stored within its memory device(s) 230 that correlates the vehicle-based pressure sensor data received at (306) to the vehicle maximum pressure value.

Additionally, at (310), the control logic 300 includes transmitting one of the determined implement maximum pressure value to the vehicle-based computing system or the determined vehicle maximum pressure value to the implement-based computing system. Specifically, in several embodiments, the implement-based computing system 210 may transmit the implement maximum pressure value determined at (304) to the vehicle-based computing system 224 via the communicative link 202. Alternatively, in several embodiments, the vehicle-based computing system 224 may transmit the vehicle maximum pressure value determined at (308) to the implement-based computing system 210 via the communicative link 226.

As will be described below, the determined implement maximum pressure value and the determined vehicle maximum pressure value may be used to control the operation of the harvesting implement 32. In this respect, transmitting the determined implement maximum pressure value or the determined vehicle maximum pressure value between the implement-based computing system 210 and the vehicle-based computing system 224 improves the operation of the harvesting implement 32 by negating the need for pressure sensing loops that become obstructed by contaminants that negatively affect pressure readings.

Furthermore, at (312), the control logic 300 includes receiving one of the determined vehicle maximum pressure value or the determined implement maximum pressure value. Specifically, in several embodiments, the implement-based computing system 210 may receive the vehicle maximum pressure value transmitted at (310) by the vehicle-based computing system 224. Alternatively, in several embodiments, the vehicle-based computing system 224 may receive the implement maximum pressure value transmitted at (310) by the implement-based computing system 210.

Moreover, as shown in FIG. 3, at (314), the control logic 300 includes determining an overall maximum pressure value that is equal to the greater of the determined implement maximum pressure value and the determined vehicle maximum pressure value. Specifically, in several embodiments, the implement-based computing system 210 is configured to determine the overall maximum pressure value that is equal to the greater of the implement maximum pressure value determined at (304) by the implement-based computing system 210 and the vehicle maximum pressure value received at (312) from the vehicle-based computing system 224.

Alternatively, in several embodiments, the vehicle-based computing system is configured to determine the overall maximum pressure value that is equal to the greater of the implement maximum pressure value received at (312) from the implement-based computing system 210 and the vehicle maximum pressure value determine at (308) by the vehicle-based computing system 224.

Furthermore, at (316), the control logic 300 includes controlling the operation of the pump based on the determined overall maximum pressure value. Specifically, as mentioned above, in several embodiments, the vehicle-based computing system 224 is communicatively coupled to the pump(s) 216 via the communicative link 226. In this respect, the vehicle-based computing system 224 is configured to control the operation of the pump(s) 216, for example by increasing or decreasing the flow of pressurized hydraulic fluid between the fluid reservoir 206 and the plurality of implement actuators 41, based on the overall maximum pressure value determined at (314). For example, some embodiments, the vehicle-based computing system 224 may be configured to control the operation of the pump(s) 216 based on the overall maximum pressure value determined by the vehicle-based computing system at (314).

In alternative embodiments, the vehicle-based computing system 224 may be configured to control the operation of the pump(s) 216 based on the overall maximum pressure value determined by the implement-based computing system at (314), which is then be transmitted by the implement-based computing system 210 to the vehicle-based computing system 224. Upon completion of (316), the control logic 300 returns to (302).

Figure 4:
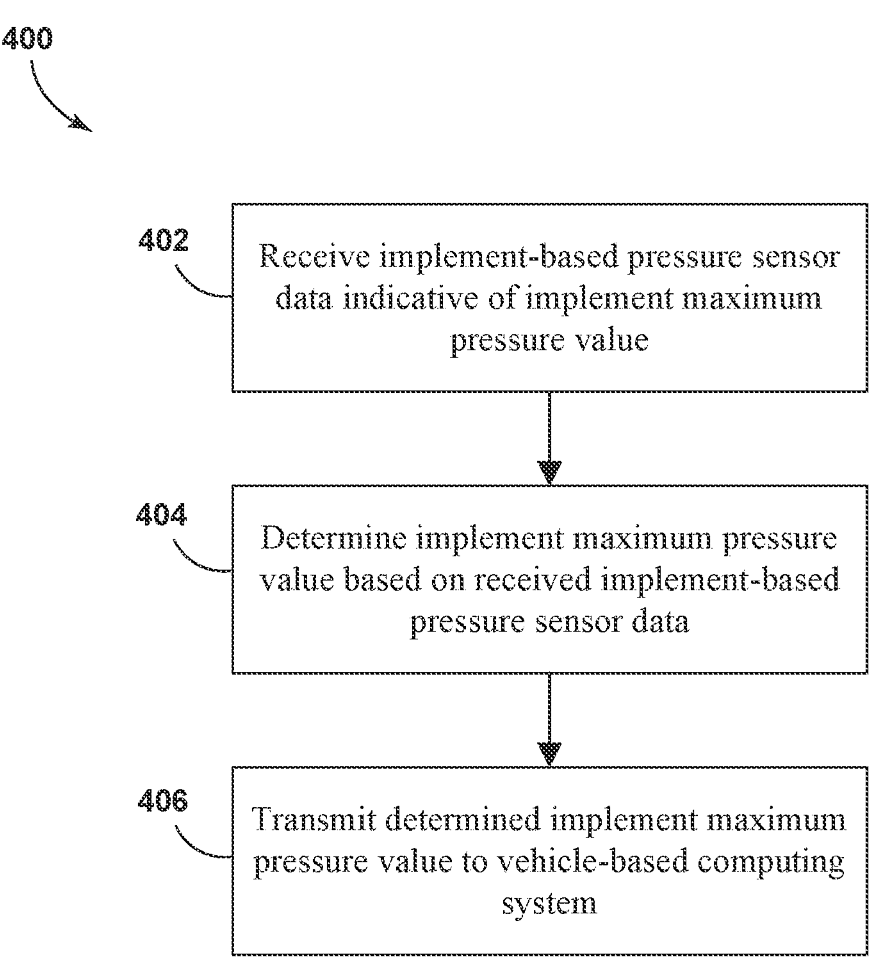
FIG. 4 illustrates a flow diagram of one embodiment of a method for controlling the operation of a harvesting implement in accordance with aspects of the present subject matter.

Referring now to FIG. 4, a flow diagram of one embodiment of a method 400 for controlling the operation of a harvesting implement is illustrated in accordance with aspects of the present subject matter. In general, the method 400 will be described herein with reference to the agricultural harvester 10, and the system 200 described above with reference to FIGS. 1-3. However, it should be appreciated by those of ordinary skill in the art that the disclosed method 400 may generally implemented with any agricultural harvester having any suitable machine configuration and/or any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (402), the method 400 may include receiving, with an implement-based computing system, implement-based pressure sensor data indicative of an implement maximum pressure value, wherein the implement maximum pressure value is a maximum pressure value of the plurality of hydraulically driven implement components. For instance, as described above, the implement-based computing system 210 may be configured to receive data from the implement-based pressure sensor 102 indicative of the implement maximum pressure value, which is the maximum pressure value of the plurality of implement actuators 41.

Additionally, at (404), the method 400 may include determining, with the implement-based computing system, the implement maximum pressure value based on the received implement-based pressure sensor data. For instance, as described above, the implement-based computing system 210 may be configured to determine the implement maximum pressure value based on the data received from the implement-based pressure sensor 102.

Furthermore, at (406), the method 400 may include transmitting, with the implement-based computing system, the determined implement maximum pressure value to a vehicle-based computing system. For instance, as described above, the implement-based computing system 210 may be configured to transmit the determined implement maximum pressure value to the vehicle-based computing system 224.

It is to be understood that the steps of the control logic 300 and the method 400 are performed by the implement-based computing system 210 and the vehicle-based computing system 224 upon loading and executing software code or instructions which are tangibly stored on one or more tangible computer readable media, such as one or more magnetic media (e.g., a computer hard drive(s)), one or more optical media (e.g., an optical disc(s)), solid-state memory (e.g., flash memory), and/or other storage media known in the art. Thus, any of the functionality performed by the implement-based computing system 210 and the vehicle-based computing system 224 described herein, such as the control logic 300 and the method 400, is implemented in software code or instructions which are tangibly stored on one or more tangible computer readable media. The implement-based computing system 210 and the vehicle-based computing system 224 load the software code or instructions via a direct interface with the one or more computer readable media or via a wired and/or wireless network. Upon loading and executing such software code or instructions by the implement-based computing system 210, the implement-based computing system 210 may perform any of the functionality of the implement-based computing system 210 described herein, including any steps of the control logic 300 and the method 400 described herein. Likewise, upon loading and executing such software code or instructions by the vehicle-based computing system 224, the vehicle-based computing system 224 may perform any of the functionality of the vehicle-based computing system 224 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A harvesting implement, comprising:

a header frame configured to be pivotably coupled to a harvester base vehicle;

a reel pivotably coupled to the header frame and configured to direct crop material toward a cutting bar configured to sever the crop material from a field surface;

a plurality of implement actuators configured to pivotably adjust the header frame and the reel, the plurality of implement actuators configured to receive a flow of pressurized hydraulic fluid from the harvester base vehicle;

an implement-based pressure sensor configured to generate data indicative of an implement maximum pressure value, wherein the implement maximum pressure value is a maximum pressure value of the plurality of implement actuators; and an implement-based computing system communicatively coupled to the implement-based pressure sensor and a vehicle-based computing system positioned on the harvester base vehicle, the implement-based computing system configured to:

determine the implement maximum pressure value based on the data generated by the implement-based pressure sensor; and transmit the determined implement maximum pressure value to the vehicle-based computing system.

2. The harvesting implement of claim 1, wherein the implement-based computing system is further configured to:

transmit an input to the vehicle-based computing system to control an operation of a pump, the pump being positioned on the harvester base vehicle and configured to pump hydraulic fluid between the plurality of implement actuators and a fluid reservoir positioned on the harvester base vehicle, based on the determined implement maximum pressure value.

3. The harvesting implement of claim 1, wherein the implement-based computing system is further configured to:

receive a determined vehicle maximum pressure value from the vehicle-based computing system, wherein the determined vehicle maximum pressure value is a maximum pressure value of a pump positioned on the harvester base vehicle and configured to pump hydraulic fluid between the plurality of implement actuators and a fluid reservoir positioned on the harvester base vehicle; and determine an overall maximum pressure value that is equal to the greater of the determined implement maximum pressure value and the determined vehicle maximum pressure value.

4. The harvesting implement of claim 3, wherein the implement-based computing system is further configured to:

transmit an input to the vehicle-based computing system to control an operation of the pump based on the determined overall maximum pressure value.

5. The harvesting implement of claim 1, wherein the implement-based computing system is wirelessly communicatively coupled to the vehicle-based computing system.

6. A system for controlling the operation of a harvesting implement, the system comprising:

a plurality of hydraulically driven implement components positioned on a harvesting implement and configured to receive a flow of pressurized hydraulic fluid from a harvester base vehicle, the harvester base vehicle configured to tow the harvesting implement;

an implement-based pressure sensor positioned on the harvesting implement and configured to generate data indicative of an implement maximum pressure value, wherein the implement maximum pressure value is a maximum pressure value of the plurality of hydraulically driven implement components; and an implement-based computing system positioned on the harvesting implement, the implement-based computing system communicatively coupled to the implement-based pressure sensor and a vehicle-based computing system positioned on the harvester base vehicle, the implement-based computing system configured to:

determine the implement maximum pressure value based on the data generated by the implement-based pressure sensor; and transmit the determined implement maximum pressure value to the vehicle-based computing system.

7. The system of claim 6, further comprising:

a fluid reservoir positioned on the harvester base vehicle; and a pump positioned on the harvester base vehicle and configured to pump hydraulic fluid between the fluid reservoir and the plurality of hydraulically driven implement components, wherein the implement-based computing system is further configured to:

transmit an input to the vehicle-based computing system to control an operation of the pump based on the determined implement maximum pressure value.

8. The system of claim 6, further comprising:

a fluid reservoir positioned on the harvester base vehicle;

a pump positioned on the harvester base vehicle and configured to pump hydraulic fluid between the fluid reservoir and the plurality of hydraulically driven implement components; and the vehicle-based computing system, wherein the vehicle-based computing system is configured to:

control an operation of the pump based on the determined implement maximum pressure value.

9. The system of claim 6, further comprising:

a fluid reservoir positioned on the harvester base vehicle; and a pump positioned on the harvester base vehicle and configured to pump hydraulic fluid between the fluid reservoir and the plurality of hydraulically driven implement components, wherein the implement-based computing system is further configured to:

receive a determined vehicle maximum pressure value from the vehicle-based computing system, wherein the determined vehicle maximum pressure value is a maximum pressure value of the pump; and determine an overall maximum pressure value that is equal to the greater of the determined implement maximum pressure value and the determined vehicle maximum pressure value.

10. The system of claim 9, wherein the implement-based computing system is further configured to:

transmit an input to the vehicle-based computing system to control an operation of the pump based on the determined overall maximum pressure value.

11. The system of claim 9, further comprising:

the vehicle-based computing system, wherein the vehicle-based computing system is configured to:

control an operation of the pump based on the determined overall maximum pressure value.

12. The system of claim 6, further comprising:

a fluid reservoir positioned on the harvester base vehicle;

a pump positioned on the harvester base vehicle configured to pump hydraulic fluid between the fluid reservoir and the plurality of hydraulically driven implement components;

a vehicle-based pressure sensor positioned on the harvester base vehicle and configured to generate data indicative of a vehicle maximum pressure value, wherein the vehicle maximum pressure value is a maximum pressure value of the pump; and the vehicle-based computing system communicatively coupled to the vehicle-based pressure sensor, wherein the vehicle-based computing system is configured to:

determine the vehicle maximum pressure value based on the data generated by the vehicle-based pressure sensor; and transmit the determined vehicle maximum pressure value to the implement-based computing system.

13. The system of claim 6, wherein at least one of the hydraulically driven implement components of the plurality of hydraulically driven implement components comprises an implement actuator configured to pivotably adjust a crop harvesting tool positioned on the harvesting implement.

14. The system of claim 6, wherein the implement-based computing system is wirelessly communicatively coupled to the vehicle-based computing system.

15. A method for controlling the operation of a harvesting implement, the harvesting implement including a plurality of hydraulically driven implement components configured to receive a flow of pressurized hydraulic fluid from a harvester base vehicle, the harvesting implement also including a fluid reservoir and a pump configured to pump hydraulic fluid between the fluid reservoir and the plurality of hydraulically driven implement components, the method comprising:

receiving, with an implement-based computing system, implement-based pressure sensor data indicative of an implement maximum pressure value, wherein the implement maximum pressure value is a maximum pressure value of the plurality of hydraulically driven implement components;

determining, with the implement-based computing system, the implement maximum pressure value based on the received implement-based pressure sensor data; and transmitting, with the implement-based computing system, the determined implement maximum pressure value to a vehicle-based computing system.

16. The method of claim 15, further comprising:

transmitting, with the implement-based computing system, an input to a vehicle-based computing system to control an operation of the pump based on the determined implement maximum pressure value.

17. The method of claim 15, further comprising:

receiving, with the implement-based computing system, a determined vehicle maximum pressure value from the vehicle-based computing system, wherein the determined vehicle maximum pressure value is a maximum pressure value of the pump; and determining, with the implement-based computing system, an overall maximum pressure value that is equal to the greater of the determined implement maximum pressure value and the determined vehicle maximum pressure value.

18. The method of claim 17, further comprising:

transmitting, with the implement-based computing system, an input to the vehicle-based computing system to control an operation of the pump based on the determined overall maximum pressure value.

* * * * *